United States Patent

Ishida et al.

[11] Patent Number: 5,973,751
[45] Date of Patent: Oct. 26, 1999

[54] PICTURE REPLACEMENT SYSTEM AND PICTURE REPLACEMENT METHOD

[75] Inventors: Masayuki Ishida; Toru Koguma, both of Tokyo, Japan

[73] Assignee: Nippon Television Network Corp., Japan

[21] Appl. No.: 08/819,600

[22] Filed: Mar. 17, 1997

[51] Int. Cl.⁶ .............................. H04N 9/74; H04N 5/262
[52] U.S. Cl. ..................... 348/590; 348/591; 348/596; 348/239; 348/578
[58] Field of Search ..................................... 348/578, 584, 348/585, 590, 593, 591, 594, 595, 596, 239; H04N 9/74, 5/262

[56] References Cited

U.S. PATENT DOCUMENTS 4,823,183  4/1989  Jackson .

Primary Examiner—Sherrie Hsia
Attorney, Agent, or Firm—Ostrolenk, Faber, Gerb & Soffen, LLP

[57] ABSTRACT

A picture replacement system for replacing a specified area of an original picture, with a desired picture comprising at least one camera for shooting an original picture of the subject; at least one irradiation unit for radiating a specified area of the subject with a predetermined invisible light ray; a picture generation unit for generating a desired picture that matches a size of the specified area; a detection unit for detecting the invisible light ray reflecting from the specified area that has passed around an obstruction in front of the specified area of the subject without being obstructed; a key signal generation unit for generating a key signal indicating a replacement area of the original picture based on a detection result of the detection unit; and a replacement unit for replacing the specified area within the replacement area with a desired picture corresponding to the key signal indicating the replacement area.

20 Claims, 3 Drawing Sheets

PICTURE REPLACEMENT SYSTEM AND PICTURE REPLACEMENT METHOD

BACKGROUND OF THE INVENTION

The present invention relates to a system and method for replacing a specified area of a present (original) picture with a desired picture. The present invention further relates to a system and method for processing the picture replacement by matching the desired picture to the present picture so that the desired picture appears to have been a part of the present picture.

Accompanied with the recent prosperity of TV broadcasting, a large number of advertisements have appeared on TV. For example, when watching a ball game on TV, viewers see not only the game but also advertisements painted on the fence of the stadium behind ball players, for example, company names, logos, slogans and the like.

There has been such circumstance that only a certain logo is required to be replaced with another logo during rebroadcasting. Or the circumstance has demanded to televise the specified logo at a spot that was originally a blank area during rebroadcasting.

The conventional art has easily allowed a specific logo to replace a predetermined area of a picture. However it has been difficult to execute such replacement quite naturally so that the logo appears to have been a part of the picture. For example, during a baseball game rebroadcast, if the logo shown on the back fence is replaced with another logo, the baseball player standing in front of such logo is also replaced, thus spoiling the whole broadcast.

SUMMARY OF THE INVENTION

An objective of the present invention is to provide a system and method for replacing a specified area of a present picture with another picture matched thereto so that the replacement picture appears to have been a part of the present picture.

The above objective of the present invention is achieved by a picture replacement system for replacing a specified area of a present picture with a desired picture comprising at least one camera for shooting a present picture of the subject; at least one unit of irradiation means for radiating a specified area of the subject with a predetermined invisible light ray; picture generation means for generating a desired picture that matches a size of the specified area; detection means for detecting the invisible light ray reflecting from the specified area that has passed around a shield or obstruction in front of the specified area of the subject without being obstructed; key signal generation means for generating a key signal indicating a replacement area of the present picture based on a detection result of the detection means; and replacement means for replacing a present picture within the replacement area with a desired picture within an area corresponding to the replacement area.

It is preferable that the camera has a fixed shooting range for shooting a present picture.

The invisible light ray has a wavelength either longer or shorter than that of a visible light ray. The invisible light ray can be an infrared ray, far infrared ray or ultraviolet radiation.

Preferably the detection means is constructed to detect the invisible light ray at a picture element pixel density that is the same as the picture element pixel density used by a camera for shooting a subject.

It is preferable that the key signal generation means is constructed to generate a key signal having a first value indicating a picture element pixel where the invisible light ray has been detected and a second value indicating a picture element pixel where the invisible light ray has not been detected.

It is further preferable that the replacement means is a switch selectable at the above-mentioned picture element pixel density based on a key signal. The switch is so constructed to input a picture element pixel of a desired picture A when the key signal indicates a replacement picture element pixel (a pixel to be replaced) and to input a picture element pixel of a present picture when the key signal indicates a non replacement picture element pixel (a pixel not to be replaced).

Preferably the detection means is set in the camera.

The above objective of the present invention is also achieved by a picture replacement method for replacing a specified area of a present picture with a desired picture comprising the steps of radiating a specified area of a subject with a predetermined invisible light ray; shooting a present picture of the subject; generating a desired picture that matches a size of the specified area that has been shot; detection step detecting the radiated predetermined invisible light ray that has passed ground a shield or obstruction; in front of the specified area without being obstructed; generating a key signal indicating a replacement area of a present picture based on a detection result of the detection step; and replacing a present picture within a replacement area where the invisible light ray has been detected with a desired picture corresponding to the replacement area.

It is preferable that the camera has a fixed shooting range for shooting a present picture.

The invisible light ray has a wavelength either longer or shorter than that of a visible light ray. The invisible light ray, infrared ray can be a far infrared ray or ultraviolet radiation.

Preferably the detection means is constructed to detect the invisible light ray at a picture element pixel density that is the same as a picture element pixel density used by a camera for shooting a subject.

It is preferable that the key signal generation step generates a key signal having a first value indicating a picture element pixel where the invisible light ray has been detected and a second value indicating a picture element pixel where the invisible light ray has not been detected.

It is further preferable that when responding to the key signal indicating a replacement picture element pixel (a pixel to be replaced) the original step replaces the replacement picture element pixel with a picture element pixel of a desired picture matched thereto and when responding to the key signal indicating a non replacement picture element pixel (a pixel not to be replaced), the replacement step keeps the original picture element unchanged.

BRIEF DESCRIPTION OF THE DRAWINGS

These and other objects, features and advantages of the present invention will become more apparent upon a reading of the following detailed description and drawings, in which.

DESCRIPTION OF THE EMBODIMENTS

Prior to explaining embodiments of the present invention in detail, the principle of the present invention is described referring to FIGS. 1A to 1E.

Figure 1A:
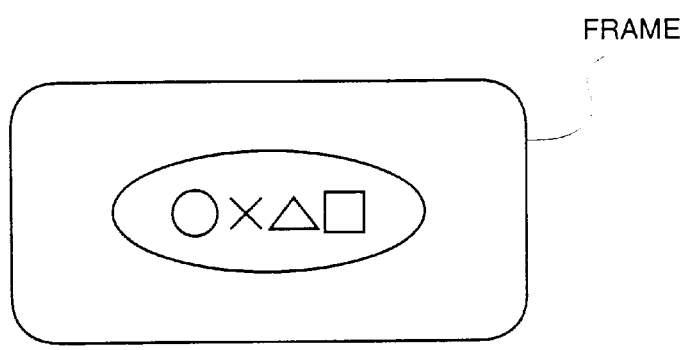
FIGS. 1A to 1E are views explaining a logo replacement method of the present invention.

A specified area of a subject that will be replaced with a specified picture (hereinafter referred to as a "logo") is radiated with an invisible light ray. FIG. 1A is a view showing that the replacement area is radiated with the invisible light ray. The inside of the frame is a shooting area. An oval area is radiated with the invisible light ray. The picture marked "○X△□" within the oval area is expected to be replaced. The invisible light ray is radiated so as not to be obstructed by any kind of shield until it reaches the area to be replaced. For example, the invisible light ray is radiated so that the oval area is not partially masked owing to, for example, a person standing between the subject and the radiation means. As the invisible light ray, infrared rays, far infrared rays or ultraviolet radiation can be used.

Figure 1B:
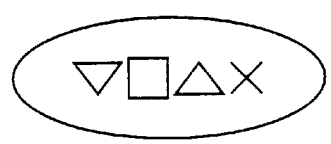

A desired logo replacing the specified area of the subject picture is generated. It is assumed that the picture within the oval area (the whole oval area including the picture ▽□△X) shown in FIG. 1B is specified as the desired logo. This logo is generated and stored at the same picture element pixel density as that used by the camera for shooting the subject.

After finishing the above-described preparation, the shooting is started.

Figure 1C:
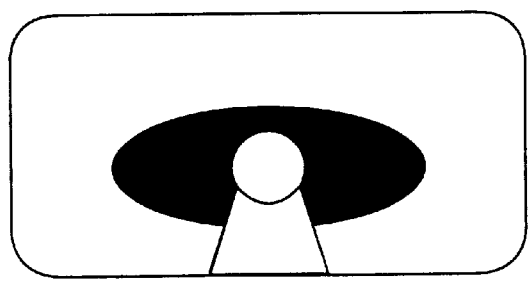

Upon start of shooting, an area that is required to be replaced is detected from the picture taken by the camera (hereinafter referred to as "present picture"). The detection is executed in the following manner. The invisible light ray is detected by detection means set in the camera. This detection means detects the invisible light rays at the same picture element pixel density as that used by the camera. The radiated invisible light ray is reflected by the subject and then is detected by the detection means. In case something obstructs the invisible light ray, for example, a person or an object, between the subject and the detection means, the invisible light ray is obstructed by such shield and thus fails to reach the detection means. FIG. 1C shows an area where the invisible light ray has been detected. That is, the black area shown in FIG. 1C is the area where the invisible light ray has been detected.

Figure 1D:

Using the above result, a key signal is generated. The key signal indicates each replacement area (picture element pixel) of the present picture that is to be replaced with the desired logo. Each replacement area (picture element pixel) required to be replaced is indicated as "0". Each non replacement area (picture element pixel) that is not to be replaced is indicated as "1". FIG. 1D is a view showing a concept of the key signal. In FIG. 1D, the black area represents the picture element pixels of the replacement area. The white area represents the picture element pixels of the non-replacement area. That is, the area occupied by the person is not replaced even though it is a part of the replacement area.

Lastly the picture of the replacement area is replaced with the desired logo using the key signal. When the key signal is 0 which indicates a picture element pixel of the replacement area, the replacement area is replaced with the prepared logo matched thereto. When the key signal is 1, which that indicates a picture element pixel not existing in the replacement area, the picture element pixel of the present picture is kept unchanged.

Figure 1E:
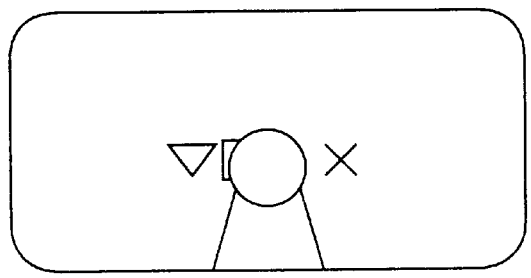

As shown in FIG. 1E, the part obstructed by a person is not replaced with the logo and the other part not obstructed by the person can be replaced with the logo.

As a result, the logo can be replaced naturally behind the person.

The system for realizing the aforementioned logo replacement method is described.

Figure 2:
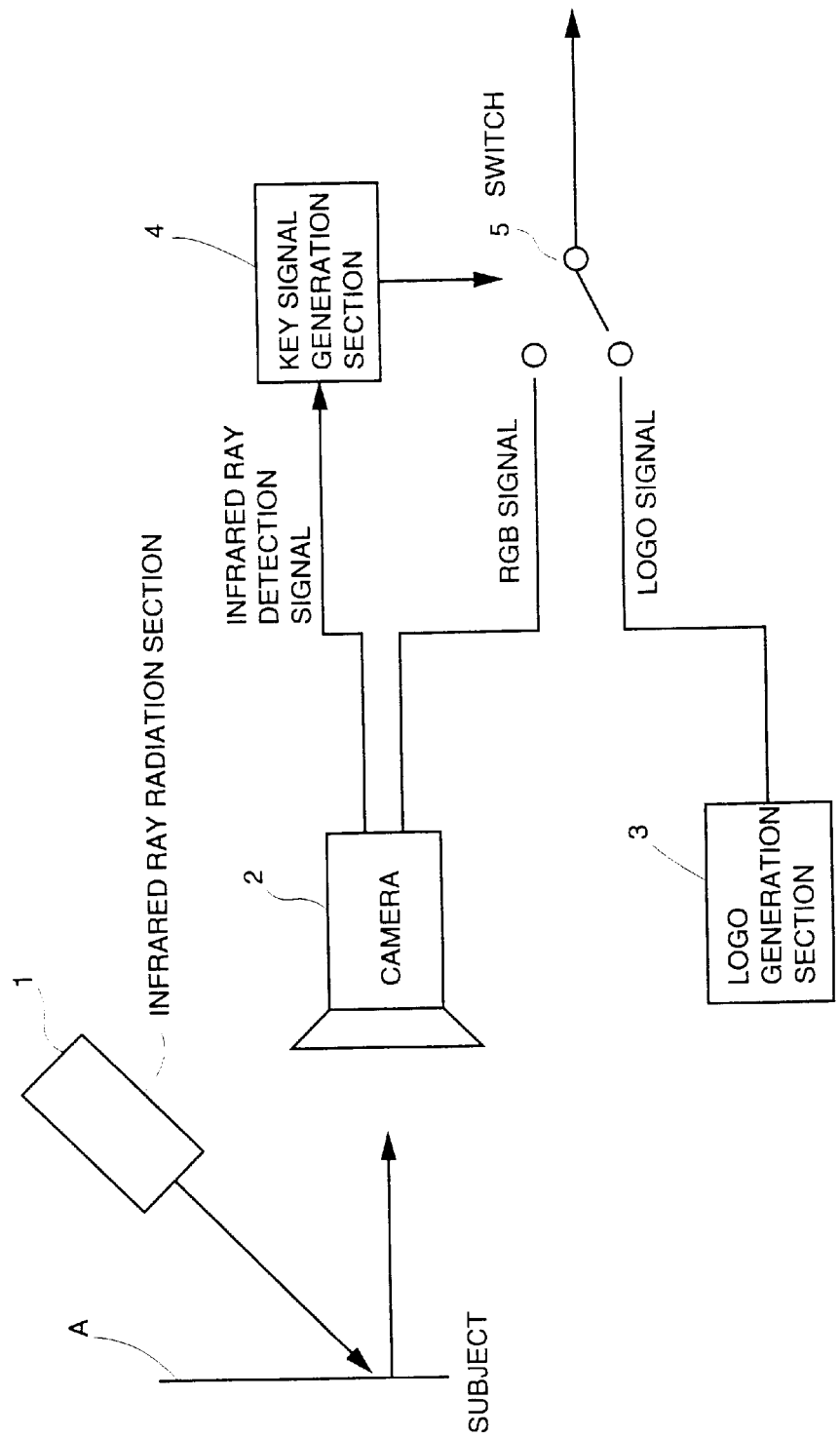
FIG. 2 is a block diagram of a logo replacement system of the present invention.

FIG. 2 is a block diagram of the logo replacement system. Each section of this system is explained in detail.

A reference numeral 1 is an infrared ray radiation section for radiating a specified area of a subject A with infrared rays. The infrared ray radiation section 1 is so set that radiated infrared ray reaches the specified area of the subject A without being obstructed.

Figure 3:
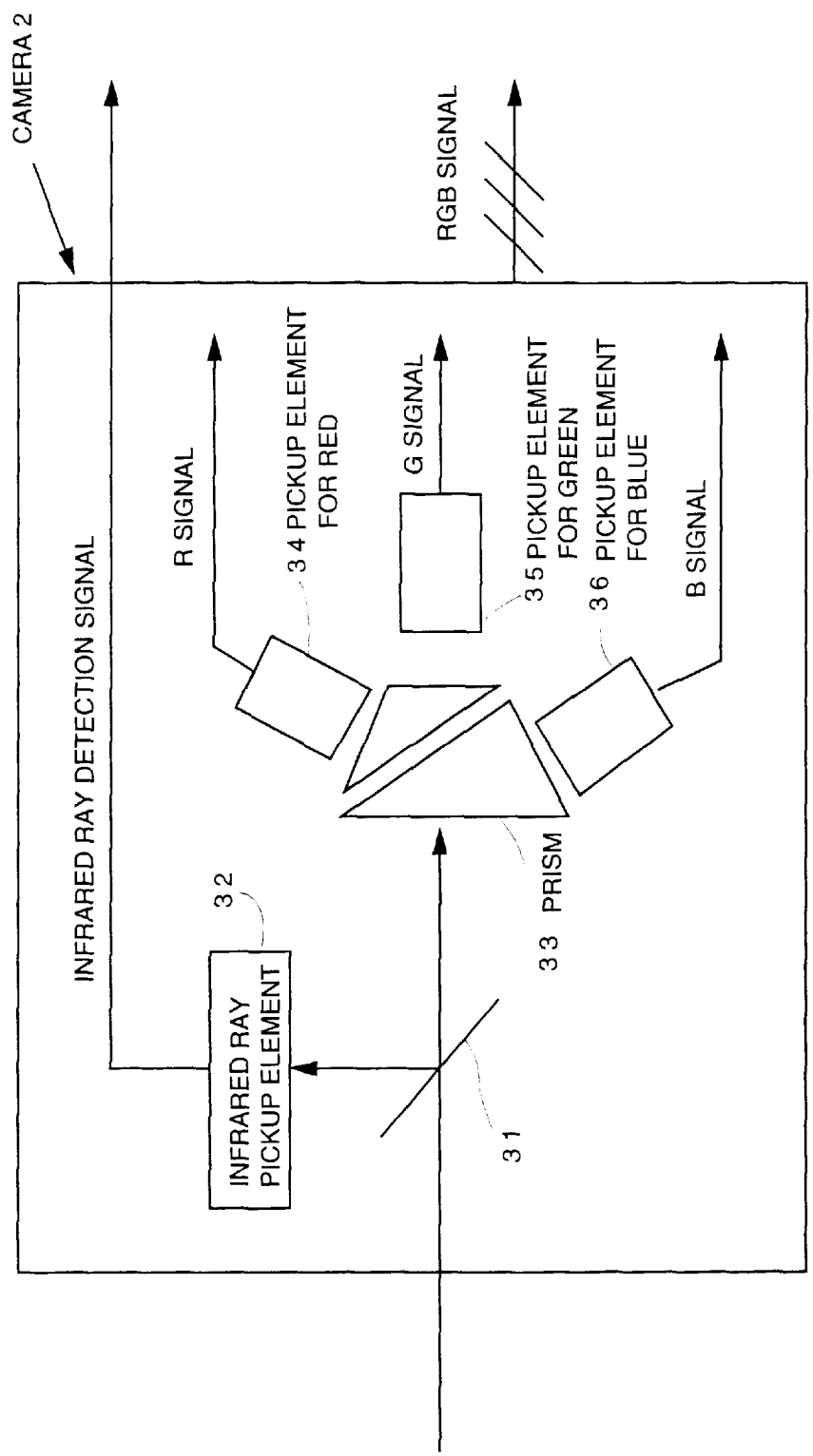
FIG. 3 is a block diagram of a camera 2 of the present invention.

A reference numeral 2 is a camera for shooting the subject A having fixed direction and angle to the subject i.e., for shooting a specified range. The camera 2 has infrared ray detection means for detecting infrared rays therein. Referring to FIG. 3, the camera 2 is further described.

In FIG. 3, a dichroic mirror 31 supplies radiation from the subject A partially to an infrared ray pickup element 32 (described below).

The reference numeral 32 is the infrared ray pickup element. Upon receiving radiation from the dichroic mirror 31, the infrared ray pickup element 32 detects infrared rays at the same picture element pixel density as that used for shooting the subject and outputs a detection signal.

A reference numeral 33 is a prism for separating the visible light ray into the three primary colors, red, green and blue.

A reference numeral 34 is a pickup element for red, 35 is a pickup element for green, and 36 is a pickup element for blue. The R signal, G signal and B signal are output from the pickup elements 34, 35 and 36, respectively. Referring again to FIG. 2, a reference numeral 3 is a logo generation section. The logo generation section 3 generates a desired logo that is desired to the original picture and stores the generated logo. The logo is so sized upon match the area to which the infrared ray is radiated. The logo is generated at a desired picture element pixel density through computer graphics techniques or the like.

A reference numeral 4 is a key signal generation section that generates a key signal based on an infrared ray detection signal supplied from the camera 2. The key signal generation section 4 generates a key signal 0 indicating each picture element pixel where the infrared ray has been detected and a key signal 1 indicating each picture element pixel where the infrared ray has not been detected. A reference numeral 5 is a switch that switches an input picture element pixel density based on the key signal. The switch 5 inputs either the present picture signal (RGB signal) from the camera 2 or the logo signal from the logo generation section 3. When the key signal indicates 0, the logo signal is output. When the key signal indicates 1, the present picture signal (RGB signal) is output. Therefore the resulting picture within the frame is the present picture in which only a predetermined area has been replaced with the logo.

The logo replacement method can be realized with the above-constructed system.

The system of the embodiment employs an infrared ray as the invisible light ray. However, a far infrared ray or ultraviolet radiation are available as well.

In this embodiment, one invisible light ray radiation unit is used for radiating the invisible light ray. However, a plurality of invisible light ray radiation units can also be used for radiating the specified area with invisible light ray. As a result, radiation can be applied to a broader area.

Using a plurality of invisible light ray radiation units to radiate the specified area in an overlapping manner, the accuracy of detecting the invisible light ray can be enhanced.

The present invention allows the logo to replace the replacement area of the present picture so as to match the present picture so that the logo appears to have been a part of the present picture. The unseen part of the replacement area of the present picture that has been hidden by the person or the object is kept unchanged. The other part of the replacement area is replaced with the logo. Therefore replacement can be done so naturally that it appears as if the logo had existed in the present picture before.

The entire disclosure of Japanese Patent Application No. 8-060450 filed on Mar. 18, 1996, including its specification, claims, drawing and summary are incorporated herein by reference in its entirety.

Although the present invention has been described in relation to particular embodiments thereof, many other variations and modifications and other uses will become apparent to those skilled in the art. The present invention is not limited by the specific disclosure herein.

What is claimed is:

1. A picture replacement system for replacing a specified area of a present picture of a subject with a desired picture comprising:

at least one camera for shooting the present picture of said subject;

irradiation means for radiating the specified area of said subject with a predetermined invisible light ray;

picture generation means for generating the desired picture that matches a size of said specified area;

detection means for detecting the invisible light ray reflecting from said specified area that has passed around a shield set in front of said specified area of said subject without being obstructed;

key signal generation means for generating a key signal indicating a replacement area of said present picture based on a detection result of said detection means; and replacement means for replacing the present picture within said replacement area with an area of the desired picture corresponding to said replacement area.

2. The picture replacement system of claim 1, wherein said camera has the fixed shooting range for shooting the present picture.

3. The picture replacement system of claim 1, wherein a wavelength of said predetermined invisible light ray is longer than the wavelength of a visible light ray.

4. The picture replacement system of claim 1, wherein a wavelength of said predetermined invisible light ray is shorter than the wavelength of a visible light ray.

5. The picture replacement system of claim 1, wherein said detection means comprises means for detecting the invisible light ray at a picture element pixel density that is the same as a picture element pixel density used by said camera for shooting said subject.

6. The picture replacement system of claim 1, wherein said key signal generation means comprises means for generating said key signal having a first value indicating a picture element pixel the invisible light ray has been detected and a second value indicating a picture element pixel where the invisible light ray has not been detected.

7. The picture replacement system of claim 1, wherein said replacement means comprises a switch selectable at a predetermined picture element pixel density in response to the key signal; for selecting the desired picture when the key signal indicates a replacement picture element pixel and for selecting the present picture when the key signal indicates a non replacement picture element pixel.

8. The picture replacement system of claim 1, wherein said detection means is set in said camera.

9. A picture replacement system for replacing a specified area of a present picture of a subject with a desired picture comprising:

at least one camera having a fixed predetermined shooting range for shooting the present picture of said subject;

irradiation means for radiating the specified area of said subject with a predetermined invisible light ray;

picture generation means for generating the desired picture that matches a size of said specified area;

detection means for detecting the invisible light ray reflecting from said specified area that has passed around a shield set in front of said specified area of said subject without being obstructed;

key signal generation means for generating a first key signal indicating an area wherein the invisible light ray is detected by said detection means and a second key signal indicating an area wherein the invisible light ray is not detected by said detection means; and replacement means for inputting said desired picture and said present picture and outputting said desired picture when said first key signal is input and outputting said present picture when said second key signal is output.

10. The picture replacement system of claim 9, wherein a wavelength of said predetermined invisible light ray is longer than the wavelength of a visible light ray.

11. The picture replacement system of claim 9, wherein a wavelength of said predetermined invisible light ray is shorter than the wavelength of a visible light ray.

12. The picture replacement system of claim 9, wherein said detection means comprises means for detecting the invisible light ray at a picture element pixel density that is the same as a picture element pixel density used by said camera for shooting said subject; and said replacement means comprises a switch selectable at said picture element pixel density in response to said first key signal and said second key signal.

13. The picture replacement system of claim 9, wherein said detection means is set in said camera.

14. A picture replacement method for replacing a specified area of a present picture of a subject with a desired picture, comprising the steps of:

radiating the specified area of said subject with a predetermined invisible light ray;

shooting the present picture of said subject;

generating the desired picture so as to match a size of said specified area;

detecting said radiated predetermined invisible light ray that has passed around a shield set in front of said specified area without being obstructed;

generating a key signal indicating a replacement area of the present picture based on a detection result of said detecting step; and replacing the present picture within a replacement area where said invisible light ray has been detected with the desired picture corresponding to said replacement area.

15. The picture replacement method of claim 14, wherein in said shooting step, said present picture is shot within a fixed shooting range.

16. The picture replacement method of claim 14, wherein a wavelength of said invisible light ray is longer than the wavelength of a visible light ray.

17. The picture replacement method of claim 14, wherein a wavelength of said invisible light ray is shorter than the wavelength of a visible light ray.

18. The picture replacement method of claim 14, wherein in said detecting step, said invisible light ray is detected at a picture element pixel density that is the same as a picture element pixel density used by a camera for shooting said subject.

19. The picture replacement method of claim 14, wherein in said key signal generation step, the key signal is generated having a first value indicating a picture element pixel where said invisible light ray has been detected and a second value indicating a picture element pixel where said invisible light ray has not been detected.

20. The picture replacement method of claim 14, wherein in response to said key signal indicating that a present picture element pixel is to be replaced, said replacing step replaces said present picture element pixel with a picture element pixel of the desired picture matched thereto, and in response to said key signal indicating that a present picture element pixel is not to be replaced, said replacing step keeps said present picture element pixel unchanged.

* * * * *